(12) United States Patent
Jarrett et al.

(10) Patent No.: US 11,953,140 B2
(45) Date of Patent: Apr. 9, 2024

(54) REPAIR PATCH FOR PIPES

(71) Applicants: Wally Jarrett, Greenwood, IN (US); Cory Jarrett, Indianapolis, IN (US)

(72) Inventors: Wally Jarrett, Greenwood, IN (US); Cory Jarrett, Indianapolis, IN (US)

(73) Assignees: Wally Jarrett, Greenwood, IN (US); Cory Jarrett, Indianapolis, IN (US)

( * ) Notice: Subject to any disclaimer, the term of this patent is extended or adjusted under 35 U.S.C. 154(b) by 0 days.

(21) Appl. No.: 17/819,084

(22) Filed: Aug. 11, 2022

(65) Prior Publication Data

US 2023/0047757 A1 Feb. 16, 2023

Related U.S. Application Data

(60) Provisional application No. 63/260,152, filed on Aug. 11, 2021.

(51) Int. Cl.
*F16L 55/168* (2006.01)

(52) U.S. Cl.
CPC .............................. *F16L 55/1683* (2013.01)

(58) Field of Classification Search
CPC ..... F16L 55/168; F16L 55/1683; F16L 55/17; F16L 41/12; B29C 73/10; Y10T 152/10909
USPC ...................................... 138/99, 89
See application file for complete search history.

(56) References Cited

U.S. PATENT DOCUMENTS

| 1,704,760 | A | | 3/1929 | Parker | |
|---|---|---|---|---|---|
| 3,432,188 | A | * | 3/1969 | Turner | F16L 47/30 408/92 |
| 4,262,701 | A | | 4/1981 | Beacom | |
| 4,966,397 | A | * | 10/1990 | McKinnon | F16L 47/30 285/423 |
| 7,337,648 | B2 | | 3/2008 | Green | |
| 7,740,028 | B1 | | 6/2010 | Wilson et al. | |
| 7,938,146 | B2 | | 5/2011 | Brooks et al. | |
| 9,638,368 | B2 | * | 5/2017 | Kriens, Jr. | F16L 47/30 |
| 10,113,659 | B2 | | 10/2018 | Miller et al. | |
| 10,436,373 | B2 | | 10/2019 | Gaunce | |
| 10,773,477 | B2 | | 9/2020 | Kirmer | |
| 10,844,989 | B1 | | 11/2020 | Francis | |
| 2006/0096651 | A1 | * | 5/2006 | Monk | F16L 55/168 138/99 |
| 2013/0056104 | A1 | * | 3/2013 | Kriens, Jr. | F16L 41/004 285/133.11 |

(Continued)

FOREIGN PATENT DOCUMENTS

WO WO-2020061616 A1 * 4/2020 .......... F16L 55/1683

*Primary Examiner* — Patrick F Brinson
(74) *Attorney, Agent, or Firm* — Woodard, Emhardt, Henry, Reeves & Wagner, LLP

(57) ABSTRACT

A patch for a pipe includes a patch body that has an outer surface and an inner surface. The patch body is curved to correspond to the curvature of a pipe that may include a defect that is desired to be sealed. A plug extends from the inner surface of the patch and the plug is configured to fit within the defect while the inner surface of the patch is in contact with an outer diameter of the pipe. The patch is adhered to the pipe using a primer and an adhesive that is applied to the outer diameter of the pipe surrounding the defect, the inner surface of the patch, or to both surfaces. Attachment straps may wrap around the pipe and the patch as the adhesive sets to maintain contact between the pipe and the patch.

17 Claims, 10 Drawing Sheets

(56) References Cited

U.S. PATENT DOCUMENTS

| | | |
|---|---|---|
| 2015/0204475 A1 | 7/2015 | Brooks |
| 2016/0178110 A1 | 6/2016 | Chang |
| 2017/0080638 A1 | 3/2017 | Livne |
| 2020/0199967 A1 | 6/2020 | Quinn et al. |

* cited by examiner

REPAIR PATCH FOR PIPES

BACKGROUND

The present disclosure pertains generally to the field plumbing, and in particular aspects, repair patches for piping. Typically, if a pipe has a crack or some other type of defect, the section of pipe including the defect needs to be removed and a new section of pipe is used to replace the defective section. Although this can be effective method of fixing a defect the pipe, in some cases, it may be difficult to access the defective pipe or to install the new section of pipe. In some instances, the pipe may be positioned behind a wall, such as drywall, and wall studs or other obstructions may make it difficult to cut the necessary section of the pipe.

Thus, there is a need for improvement in this field.

SUMMARY

In certain embodiments, a patch for repairing a pipe includes a patch body including an outer surface and an inner surface and a patch thickness defined between the outer surface and the inner surface. The inner surface and the outer surface of the patch body are curved to correspond to the curvature of the pipe that is to be patched. The radius of curvature of the inner surface is less than the radius of curvature of the outer surface. A plug extends from the inner surface of the patch body. The plug includes a plug outer surface and the outer surface of the plug is curved to correspond to an inner diameter of the pipe being patched and so that the outer surface of the plug is parallel to the inner surface of the patch body. In some instances, the plug may have a circular cross section. In some embodiments, the patch body may wrap around less than 50% of the circumference of the pipe when the plug has been fit into the defect of the pipe.

In some aspects, one or more attachment notches may be defined through the outer surface of the patch body. The one or more attachment notches may be configured to receive attachment straps that may be used to assist in securing the patch to the pipe. In some instances, the attachment notches may extend through a portion of the width of the patch and in other instances the attachment notches may extend through the entire width of the patch.

In some aspects, a first attachment notch may be positioned at a first edge of the patch body. The depth of the first attachment notch may be greatest at the first edge of the patch body. The depth of the first attachment notch may decrease moving away from the first edge of the patch body. The patch body may also include a second attachment notch that may be positioned at a second edge of the patch body. The second edge may be opposite the first edge. A depth of the second attachment notch may be greatest at the second edge of the patch body, and the depth of the second attachment notch may decrease moving away from the second edge of the patch body. In some embodiments, the patch body may also include a third attachment notch that may be positioned at the first edge of the patch body, and a fourth attachment notch that may be positioned at the second edge of the patch body. In these embodiments, the first attachment notch may be aligned to be directly across from the second attachment notch, and the third attachment notch may be aligned directly across from the fourth attachment notch.

The patch may be used to repair a pipe that includes a defect such as a drilled hole or a crack. The pipe may include a pipe wall that has an outer diameter and an inner diameter and a thickness defined between the outer diameter and the inner diameter. A pipe opening is defined by the inner diameter of the pipe. In some embodiments, the plug outer surface may be sized so that the plug outer surface does not extend past the inner diameter of the pipe wall when the plug is inserted into the defect of the pipe.

Certain embodiments include a method of patching a pipe including identifying a defect in the pipe. A plug extending from a curved inner surface of a patch body of a patch may then be inserted into the defect in the pipe. The plug may include a curved plug outer surface, and the curved plug outer surface may be parallel to the curved inner surface of the patch body. The plug may then be secured to the pipe.

To secure the patch to the pipe to repair the defect in the pipe, in some instances, the defect may be modified before the patch is adhered to the pipe so that the defect may have a size and shape that corresponds to the size and shape of the plug of the patch. A primer may be applied to the surface of the pipe wall and/or to the inner surface of the patch. An adhesive may then be applied over the primer on the surface of the pipe wall and/or the inner surface of the patch. In some aspects, the pipe wall and/or the inner surface of the patch body may be abraded before applying the primer and/or before applying the adhesive. The inner surface of the patch is brought into contact with the outer diameter of the pipe, and the plug is inserted into the defect. The plug of the patch may be sized to extend through the entire thickness of the pipe wall or through a portion of the thickness of the pipe wall. However, the plug does not extend into the pipe opening.

In some embodiments, one or more attachment straps may be wrapped around the pipe and the patch in a corresponding attachment notch or attachment notches. The attachment straps may be used to secure the patch to the pipe as the adhesive sets or dries. After the adhesive dries or sets the attachment straps may be removed from the pipe and the patch or the attachment straps if desired.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
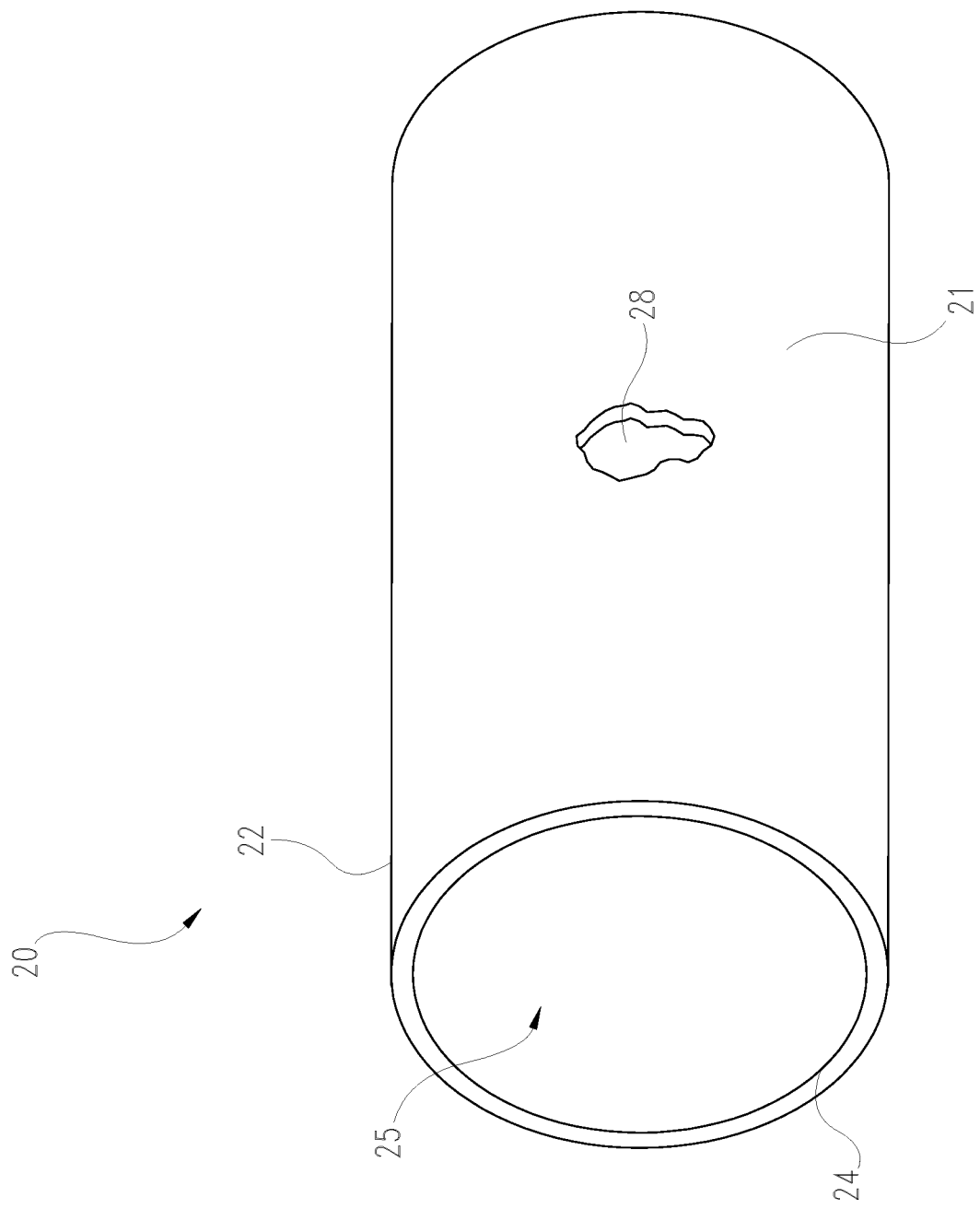
FIG. 1 is a front view of a pipe with a defect.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 shows a pipe 20, for example a pipe used for plumbing. The illustrated pipe 20 may be a single pipe that serves a segment of a plumbing system within a home, a commercial building, or another suitable structure. The pipe 20 has a cylindrical shape and includes a pipe wall 21 that includes an outer diameter 22 and an inner diameter 24. A thickness of the pipe wall 21 is formed by the distance between the outer diameter 22 and the inner diameter 24. A pipe opening 25 that allows fluid to flow through the pipe 20 is defined by pipe wall 21 and surrounded by the inner diameter 24 of the pipe 20. In this embodiment, the pipe 20 also includes a defect 28 that extends through both the outer diameter 22 and the inner diameter 24 of the wall of the pipe. The defect 28 may be a crack in pipe 20 or may be a hole or aperture through the wall 21 of the pipe 20. In some examples, the defect 28 may have been formed by drilling through the wall 21 of the pipe 20.

Figure 2:
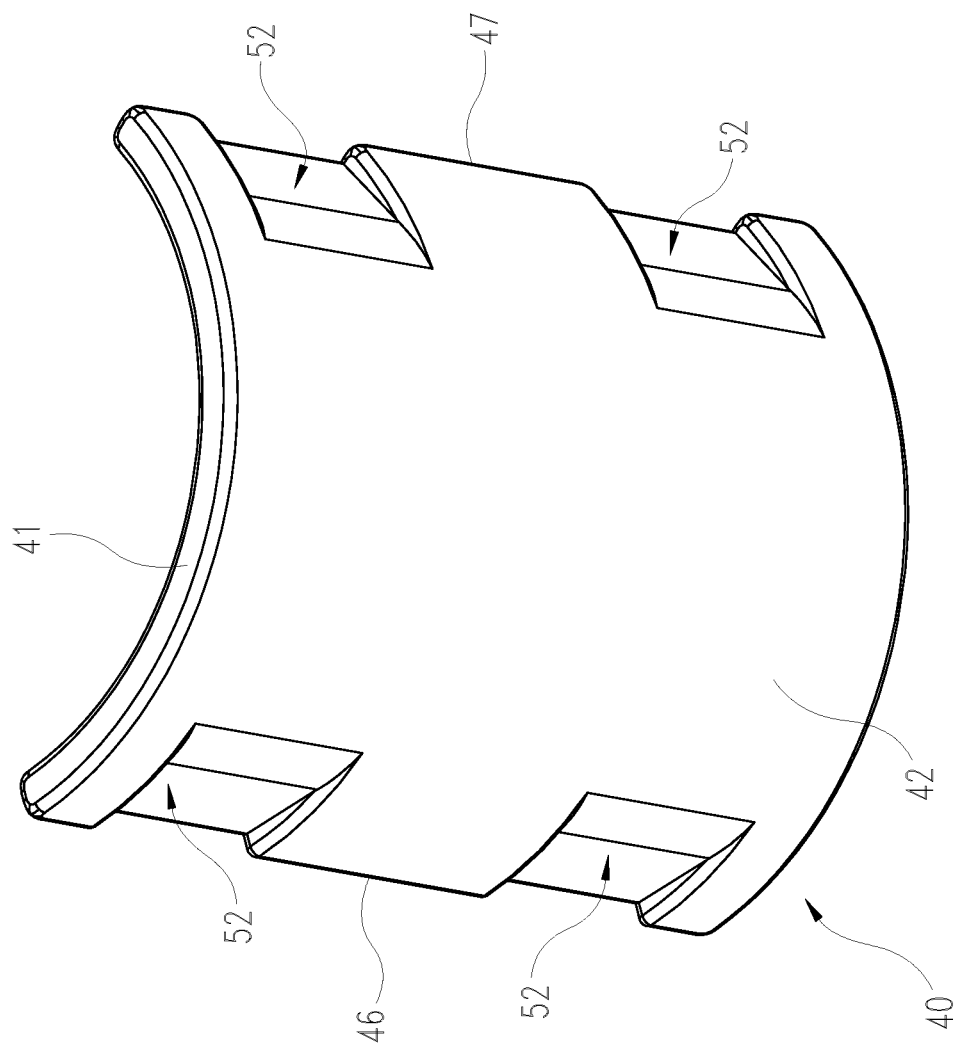
FIG. 2 is a front perspective view of a patch for the pipe in FIG. 1.
Figure 3:
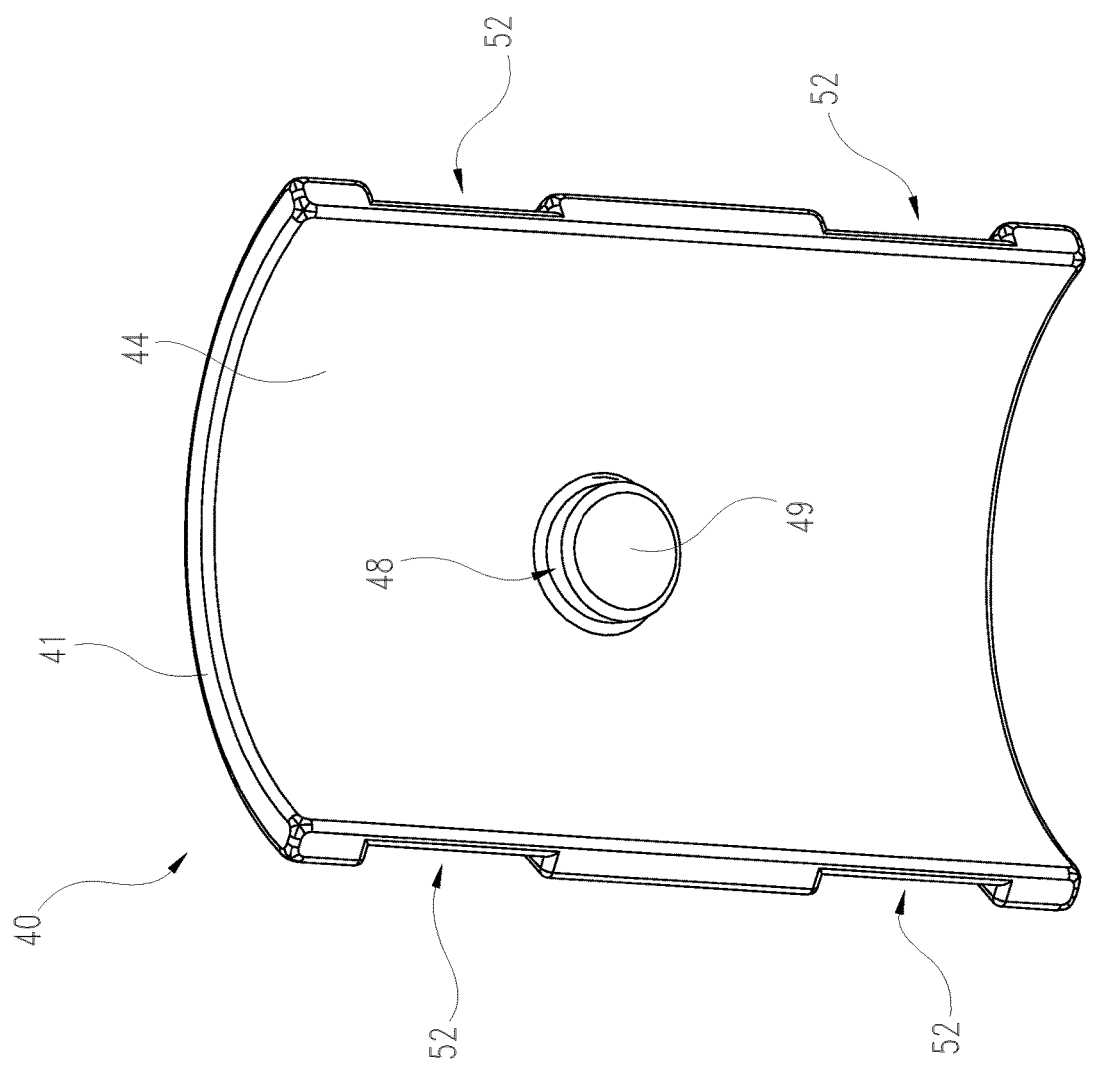
FIG. 3 is a rear perspective view of the patch of FIG. 2.

A patch 40 for the defect 28 formed through pipe 20 is illustrated in FIGS. 2 and 3. FIG. 2 is a perspective front view of the patch 40 while FIG. 3 is a perspective rear view of the patch 40. As illustrated, the patch 40 has a patch body that has a rectangular shape and is curved to correspond to the curvature of the pipe 20 to be patched. The patch body 41 includes an outer surface 42 and an inner surface 44 and a thickness of the patch is defined between the outer surface 42 and the inner surface 44 of patch 40. In the embodiment shown, both the outer surface 42 and the inner surface 44 are curved and the inner surface 44 has a radius of curvature that is less than the radius of curvature of the outer surface 42.

In most instances it is desired for the thickness of the patch 40 to be relatively small so as not to have a large effect on the effective diameter of the pipe 20 to which the patch 40 is applied. In some embodiments the thickness of the patch 40 is limited to 1 inch. In other embodiments, the thickness of the patch is less than 1 inch, for example, 0.75 inches or 0.5 inches.

A plug 48 extends from the inner surface 44 of the body 41 of the patch 40 and includes a plug outer surface 49 (see FIG. 3). The plug outer surface 49 may be curved to correspond to the inner diameter 24 of the pipe 20. In some embodiments, the plug 48 extends from the inner surface 44 at a length that is equal to or less than the distance between the outer diameter 22 and the inner diameter 24 of the pipe 20. The plug 48 is configured to fit within the defect 28 and seal the defect 28 in pipe 20. In the embodiment shown, the plug 48 has a circular cross-section; however, in other embodiments, the cross-section of the plug 48 may be other shapes as desired, such as oval or rectangular. Additionally, in the embodiment shown, the plug 48 is shown in the middle of the inner surface 44; however, in other embodiments, the plug 48 may be located at other positions on the inner surface 44 as desired.

As shown in FIG. 2, patch 40 includes attachment notches 52 that are formed in the outer surface 42 of the patch 40. One set of attachment notches 52 are positioned adjacent to a first edge 46 of the patch body 41. Another set of attachment notches 52 are positioned adjacent to a second edge 47 of the patch body 41 that is opposite of the first edge 46.

The attachment notches 52 extend through a portion of the outer surface 42 of the patch body 41 but do not extend through the entire thickness of the patch 40 through the inner surface 44. In the embodiment shown in FIG. 2, the depth that the attachment notches 52 extend through the outer surface 42 tapers as the attachment notch gets closer to an edge of the patch body 41. The attachment notches 52 extend through the greatest depth of the outer surface 42 near the edges of the patch body 41 and the depth decreases moving away from the edges. In some embodiments, the attachment notches 52 may taper so that the depth of the attachment notch 52 extends completely through the inner surface 44 and through the entire thickness of patch body 41 near the edge 46 of the patch body 41, if desired.

The attachment notches 52 are configured to receive attachment straps 56 (see FIG. 6) that may be used to secure the patch 40 to the pipe 20 as the adhesive is applied and sets. The attachment straps 56 may be removed after the adhesive is given time to set or the attachment straps may be left on the patch 40 permanently even after the patch 40 is adhered to the pipe 20.

In the embodiment shown, two attachment notches 52 are positioned at the first edge 46 of the patch body 41 and a corresponding set of two attachment notches 52 are positioned at the second edge 47 of the patch body 41, where each corresponding attachment notch 52 is aligned with an attachment notch 52 on the first edge 46 of the patch body 41. In other embodiments, the attachment notches 52 may extend the entire width of the patch body 41 so that each attachment notch 52 extends continuously from the first edge 46 of the patch 40 to the second edge 47 of the patch 40. In other embodiments, there may be more or fewer attachment notches 52 as desired. For example, there may be a single set of attachment notches 52 or another embodiment may include three sets of attachment notches 52.

The patch 40 may be made from the same material as the pipe 20 which it is patching, or the patch 40 may be made from a different material. As an example, the patch 40 may be made from PVC. In other examples, the patch may be made of a composite material, stainless steel, or another suitable material. Additionally, although the patch 40 is shown as rectangular in FIG. 2, in other embodiments, the patch 40 may have different general shapes while maintaining a curve that corresponds to the curvature of the pipe 20. As an example, the patch 40 may be trapezoidal, triangular, circular, oval, or any other suitable shape.

Figure 4:
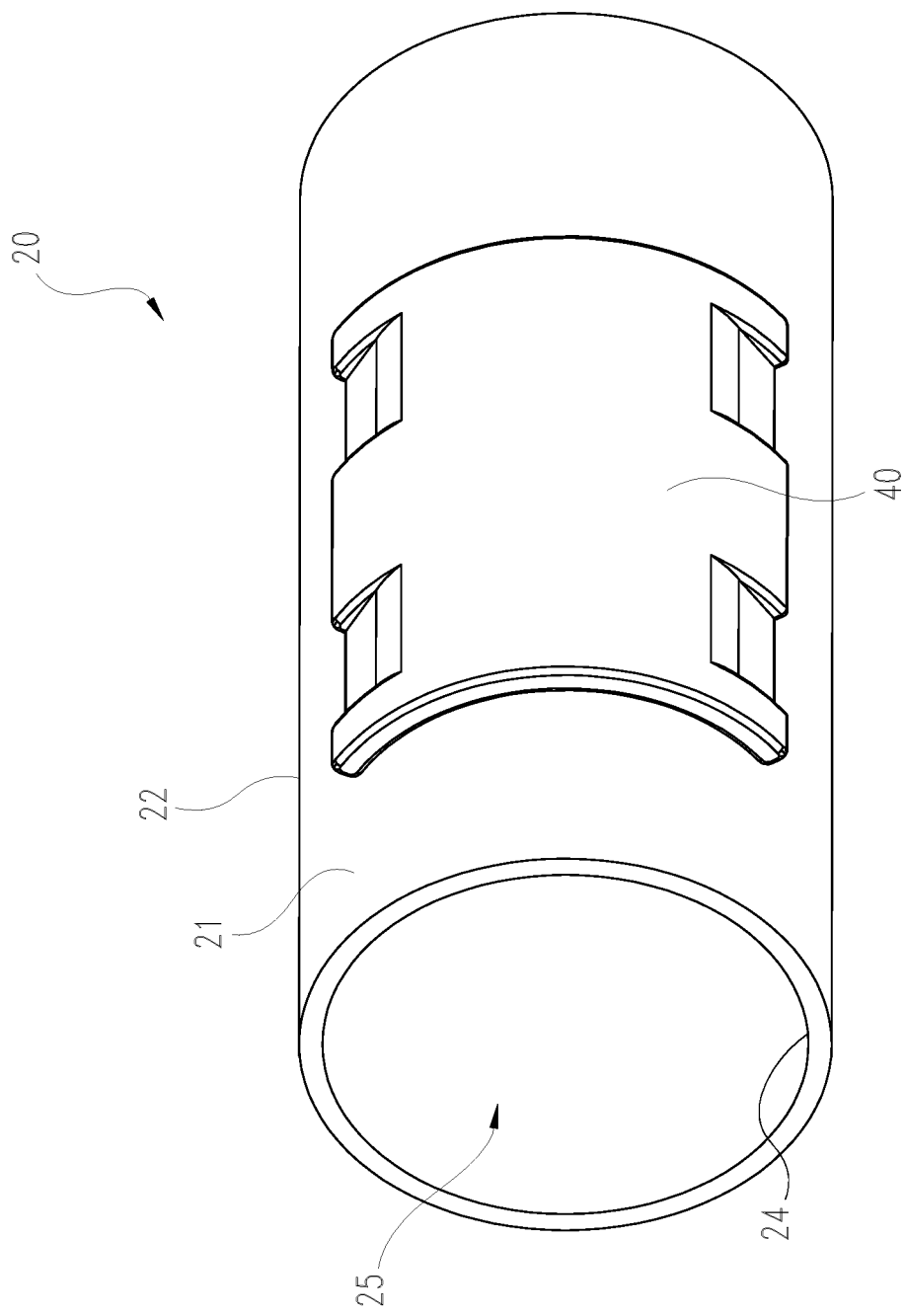
FIG. 4 is a front view of the patch of FIG. 2 installed on the pipe of FIG. 1.

As shown in FIG. 4, the patch 40 is coupled to the pipe 20 so that the inner surface 44 of the patch 40 is in contact with the outer diameter 22 of the pipe wall 21. The curvature of the inner surface 44 of the patch 40 matches the curvature of the outer diameter 22 of the pipe 20 so that the patch 40 wraps around at least a portion of the pipe 20. The thickness of the patch 40 is made sufficiently small to not greatly increase the effective diameter of the pipe 20, but to still give the patch 40 sufficient strength to provide an effective seal for defect 28.

In the embodiment shown, the patch 40 wraps around less than 50% of the circumference of the outer diameter 22 of the pipe 20. In some embodiments, the patch 40 may cover less than 40% of the circumference of the outer diameter 22 of the pipe 20, and in other embodiments, the patch 40 may be cover less than 30% of the circumference of the outer diameter 22 of the pipe 20.

Figure 5:
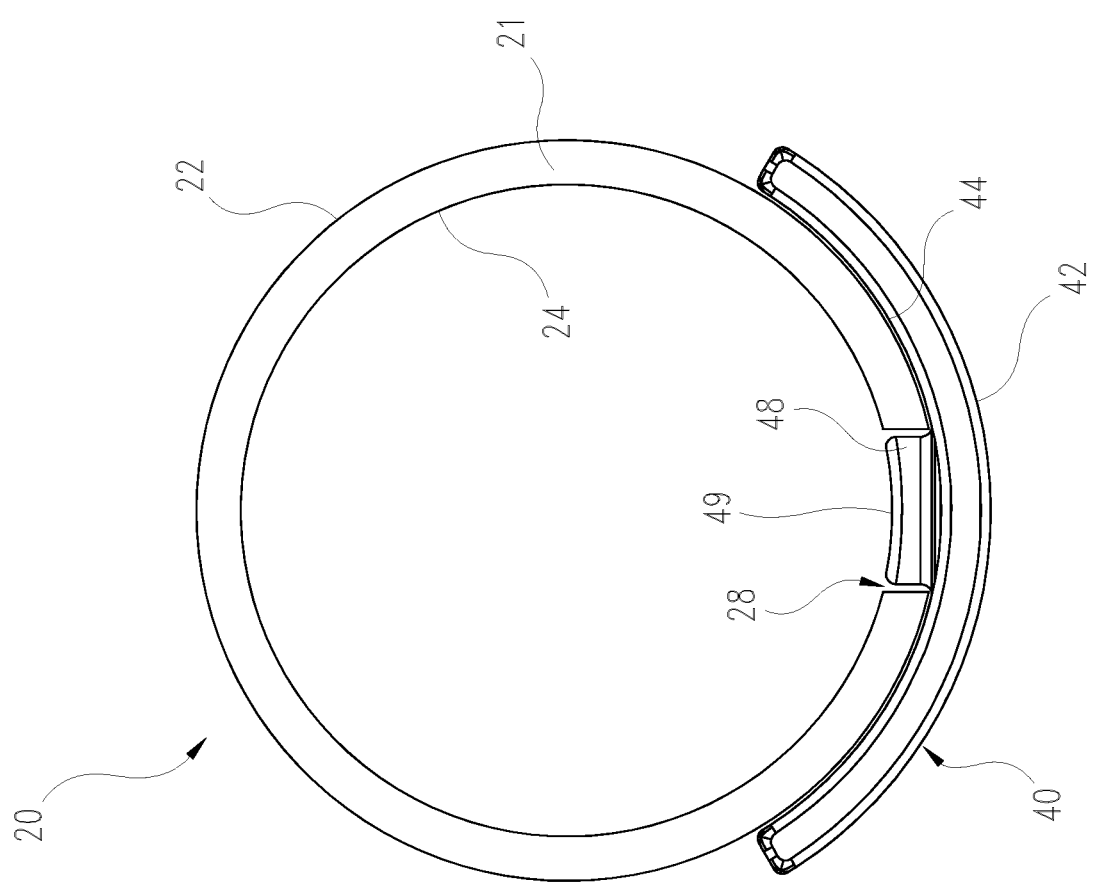
FIG. 5 is a cross-sectional view of the patch installed on the pipe as shown in FIG. 4.

FIG. 5 illustrates a cross-sectional view of the patch 40 attached to pipe 20 to plug defect 28. As shown, when the inner surface 44 of the patch 40 is in contact with the outer diameter 22 of the pipe 20, the plug 48 of the patch 40 is inserted into the defect 28 to fill the defect 28. In some embodiments, the plug 48 may be the correct size to fit directly into defect 28 without having to make any changes to the defect 28. However, in most embodiments, the defect 28 may need to be modified before inserting the plug 48 into the defect 28 so that the defect 28 and the plug 48 are the same shape and the same size, providing for a more secure seal of defect 28. Modification of the defect 28 may include drilling or another suitable process to remove material from the pipe wall 21 to modify the size and/or shape of the defect 28 to correspond to the shape and size of the plug 48. In the embodiment shown, the plug 48 has a circular shape, so the defect 28 may be drilled so that the defect 28 is a circle of the same size before application of the patch 40 so that the defect 28 matches the plug 48.

As shown in FIG. 5, the plug 48 has a length that is approximately equal to the thickness of the pipe wall 21 so that the plug 48 does not extend into the pipe opening 25. Therefore, the plug 48 does not interfere with a fluid that may flow the pipe 20 after the pipe 20 has been patched. In some embodiments, the outer surface 49 of the plug 48 may be curved to correspond to the curvature of the inner diameter 24 of the pipe 20 so that the seal formed by the plug 48 conforms to the original structure of the pipe. The curvature of the outer surface 49 of the plug 48 allows the outer surface 49 of the plug 48 to be parallel to the inner surface 44 of the patch 40.

In some embodiments, the patch 40 is coupled to the pipe 20 using an adhesive to hold the patch 40 on pipe 20. The adhesive may be applied to either the inner surface 44 of the patch 40, the plug 48, the outer diameter 22 of the pipe 20 or to some combination of these features. In some instances, the outer diameter 22 of the pipe 20 surrounding the defect 28 may also be treated before application of the adhesive used to attach the patch 40 to the pipe 20. The treatment may be used to improve adhesion of the patch 40 to the pipe 20. In some embodiments, the treatment includes a primer that may be applied to the pipe wall 21 around the defect 28 to improve the effectiveness of the adhesive. In some embodiments, primer may also be applied to inner surface 44 of the patch 40 and/or to the plug 48 before the application of adhesive.

In other embodiments, other suitable techniques or a combination of suitable techniques may be used to prepare the patch 40 and the pipe 20 for adhesion. For example, abrasion may be used to increase the effectiveness of the adhesive to secure the patch 40 to the pipe 20. Sandpaper or another suitable abrasive material may be used on the pipe 20 around the location of the defect 28 before the application of the adhesive to adhere the patch 40 to the pipe 20.

Figure 6:
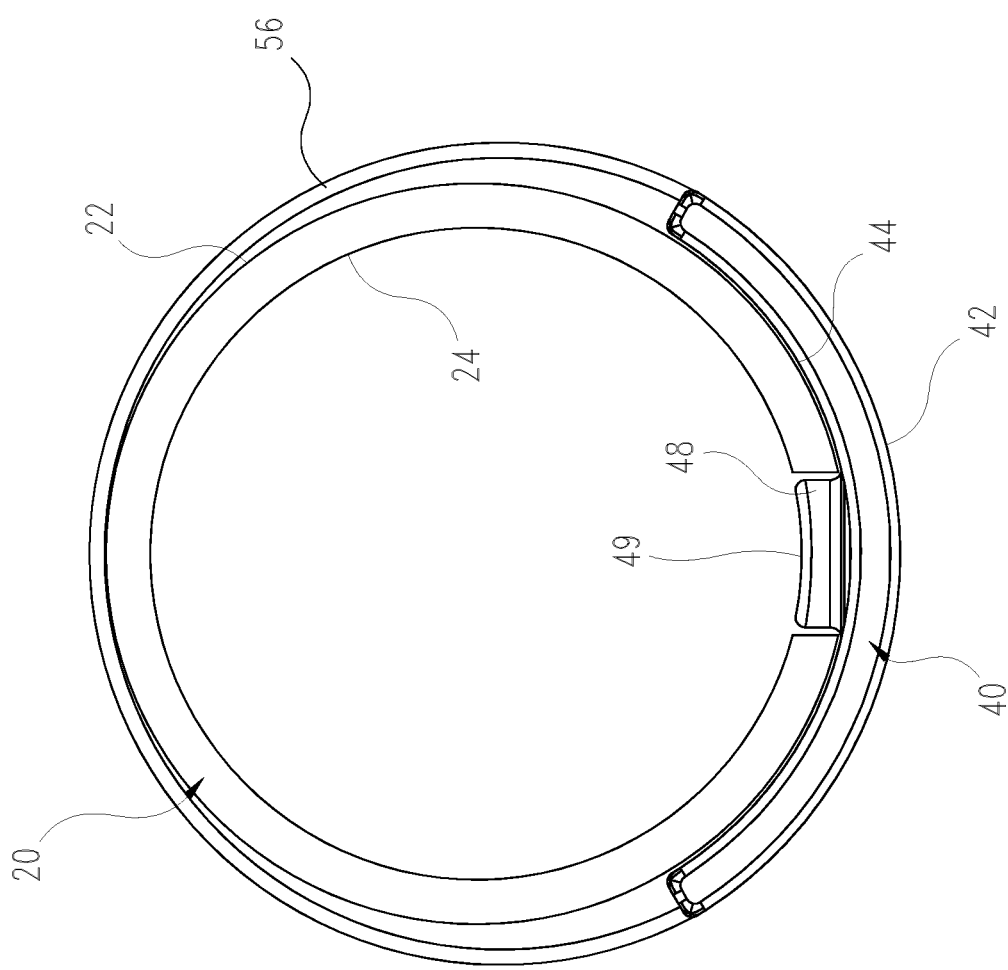
FIG. 6 is a cross-sectional view of the patch installed on the pipe as shown in FIG. 4 and including attachment straps to maintain the patch on the pipe.

A cross-sectional view of an optional feature in which an attachment strap 56 is used to further secure the patch 40 to the pipe 20 is shown in FIG. 6. The attachment strap 56 is received in a set of corresponding attachment notches 52 in the patch 40 and the attachment strap 26 is wrapped around the circumference of the pipe 20 to secure the patch 40 to the pipe 20 so that the inner surface 44 of the patch 40 remains in contact with the outer diameter 22 of the pipe 20. This allows adhesive between the patch 40 and the pipe 20 to set or dry and hold the pipe 20 and the patch 40 together. The attachment strap 56 may be any suitable securement device such as a metal band, a zip tie, or another similar apparatus.

In some embodiments, the attachment strap 56 is temporary and may be removed after the patch 40 is adhered to the pipe 20.

Figure 7:
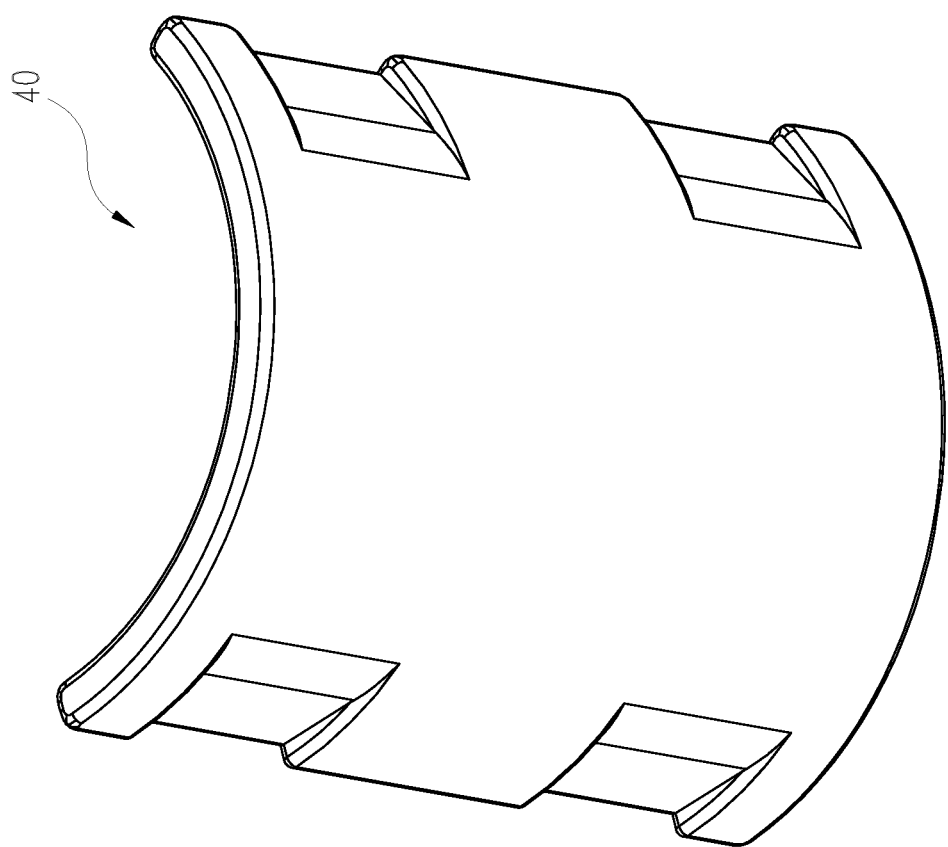
FIG. 7 is an alternative embodiment of the patch of FIG. 2 for a pipe with a different diameter.
Figure 8:
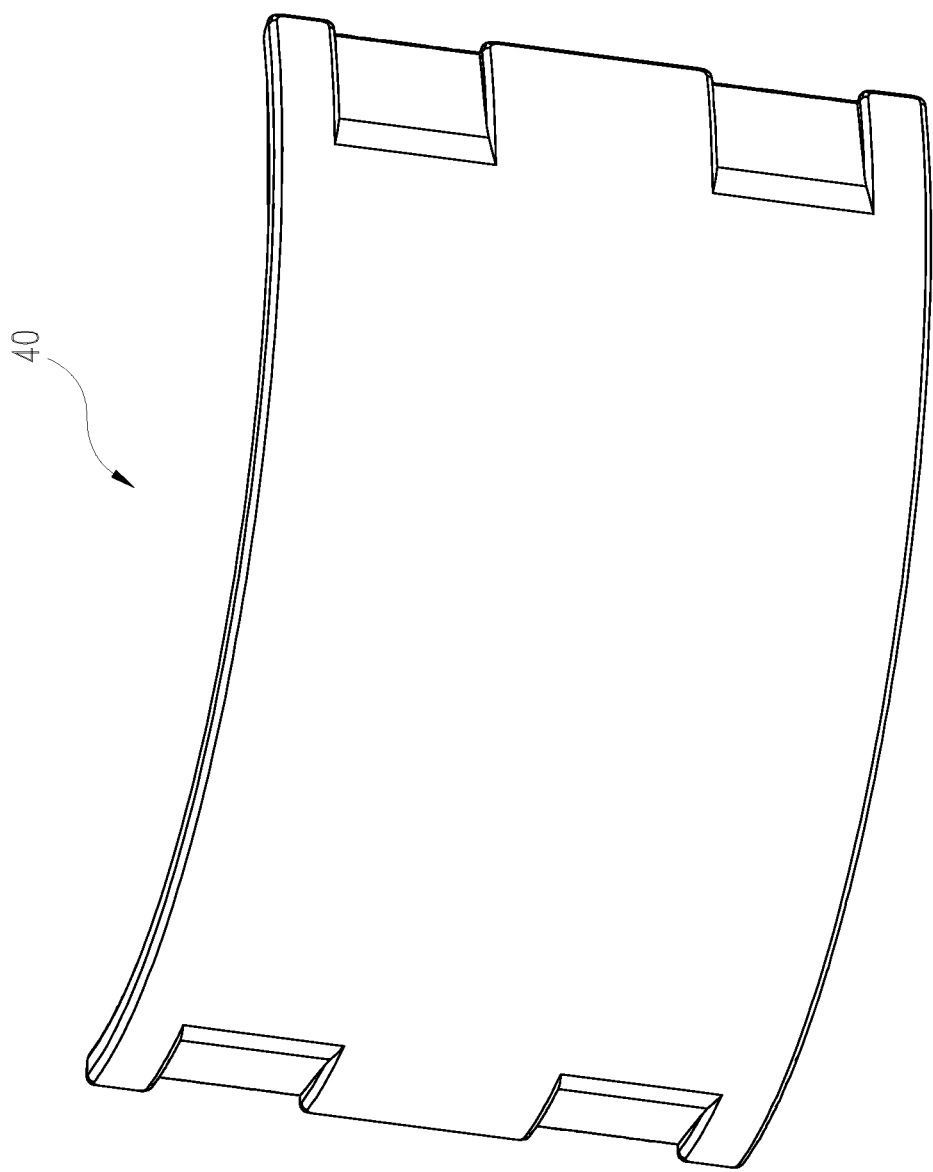
FIG. 8 is an alternative embodiment of the patch of FIG. 2 for a pipe with a different diameter.
Figure 9:
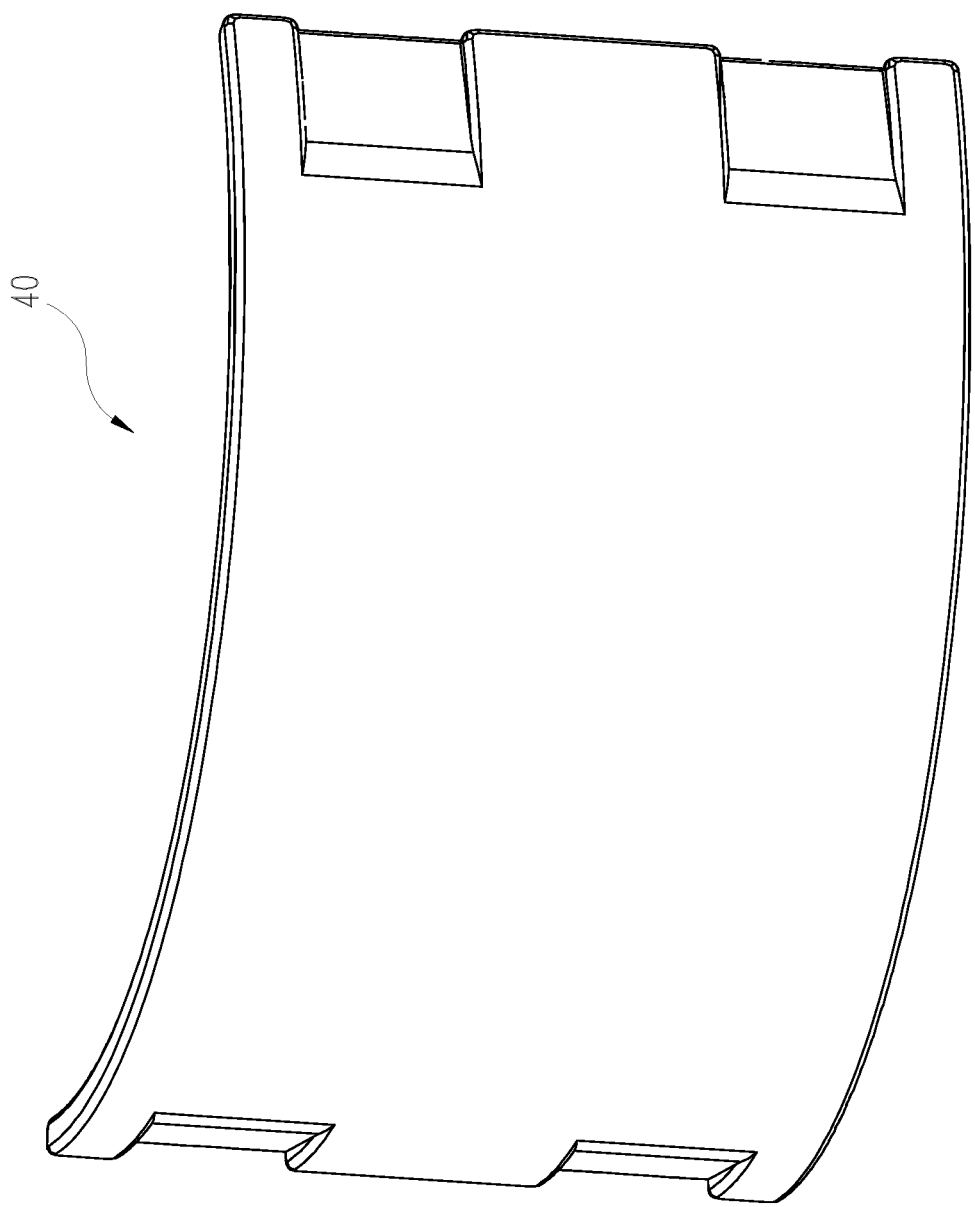
FIG. 9 is an alternative embodiment of the patch of FIG. 2 for a pipe with a different diameter.

In different embodiments, the patch may be different sizes to fit to different sized pipes. In these embodiments, the curvature and the size of the patch 40 is modified so that the inner surface 44 corresponds to the outer diameter 22 of the size of pipe 20 that includes a defect that needs to be patched. As an example, the patch 40 may be sized so that the inner surface 44 corresponds to fit on a 1.5 inch pipe. There may also be patches 40 sized so that the inner surface 44 corresponds to 2 inch pipe (see FIG. 7), 3 inch pipe (see FIG. 8), 4 inch pipe (see FIG. 9), or any other desired size of pipe. As shown in FIGS. 7-9, patches 40 designed for bigger pipes are modified by increasing the radius of curvature of the outer surface 42 and the inner surface 44. Likewise, patches 40 are modified to fit smaller pipes by decreasing the radius of curvature of the outer surface 42 and the inner surface 44.

Figure 10:
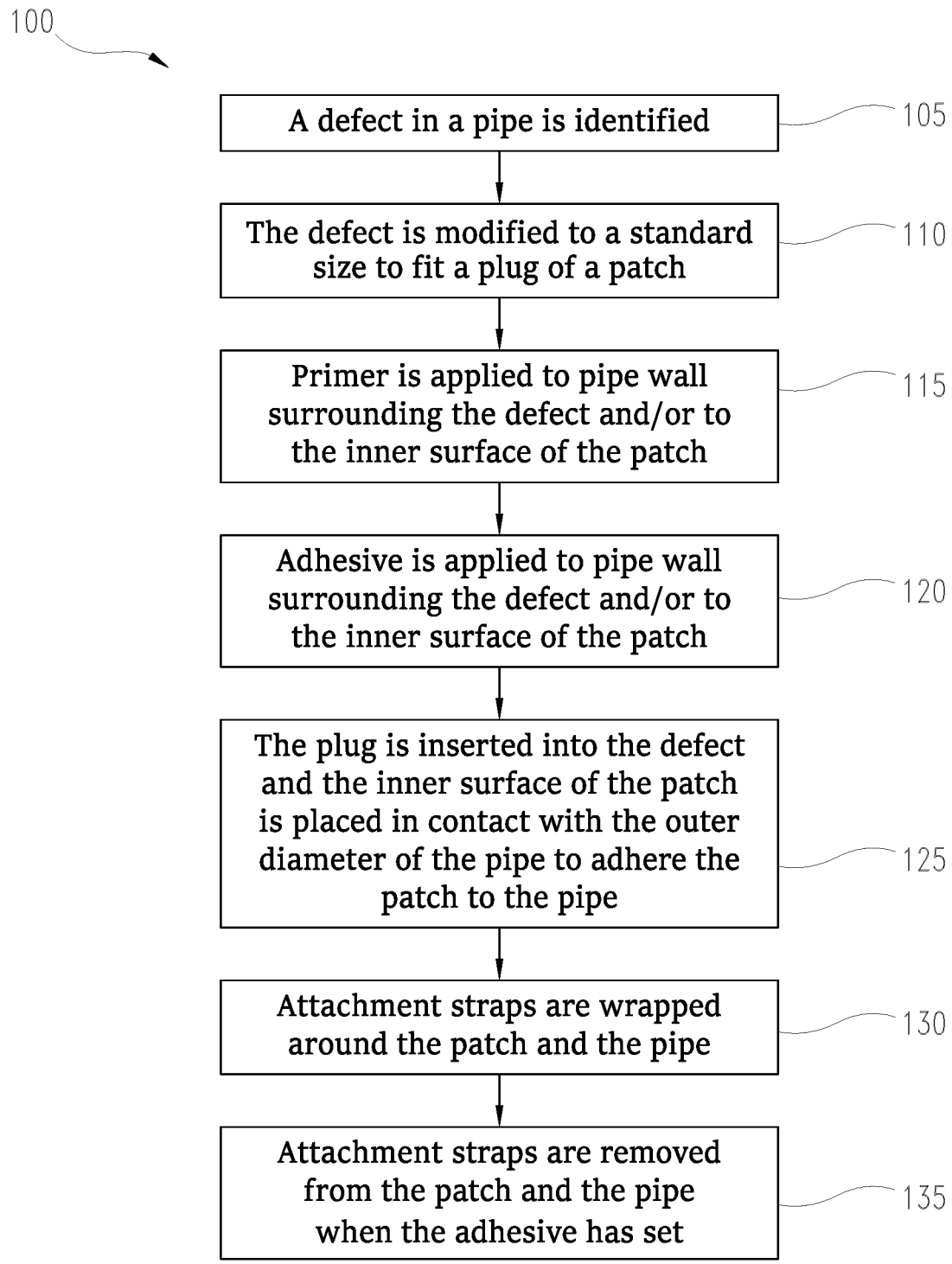
FIG. 10 is a flowchart for a method of patching a pipe including a defect.

A method of patching a pipe including a defect is described in the flow chart 100 illustrated in FIG. 10. In a first stage 105, a defect is identified in a pipe. The defect may be a crack, a drilled hole, or any issue that creates an opening through the pipe wall that could affect the flow of fluid through the pipe. In an optional second stage 110, the defect is drilled or otherwise modified to a standard size or shape to fit a plug of a patch. Typically, this requires removal of some material of the pipe wall surrounding the defect to increase the size of the defect to fit the size and the shape of the plug extending from the inner surface of the patch. In some instances, the defect may already be sized and shaped to fit the plug, and the second stage 110 becomes optional.

In a third stage 115, a primer is applied to the pipe wall 21 surrounding the defect 28, to the inner surface 44 of the patch 40, and/or to the plug 48. In a fourth stage 120, an adhesive is applied to the pipe wall 21, to the inner surface 44 of the patch 40, and/or to the plug 48 where the primer was applied in the third stage 115. The primer prepares the surfaces of the pipe wall 21 and the inner surface 44 of the patch 40 to receive the adhesive that will secure the patch 40 to the pipe 20. In some embodiments, the area of pipe wall 21 surrounding the defect 28 and/or the inner surface 44 of the patch 40 may be abraded prior to the third stage 115 and the fourth stage 120. Abrasion of the pipe wall and/or the inner surface of the patch may increase the effectiveness of the primer and the adhesive in securing the patch to the pipe.

In a fifth stage 125, the patch 40 is adhered to the pipe 20 by inserting the plug 48 of the patch 40 into the defect 28 and overlaying the patch 40 on the pipe 20 so that the inner surface 44 of the patch 40 is in contact with the outer diameter 22 of the pipe 20. The adhesive and primer mix that is on the pipe and/or the patch works to secure and attach the patch to the pipe 20 so that the plug 48 fills and seals the defect 28.

In an optional sixth stage 130, one or more attachment straps 56 are wrapped around the patch 40 and the pipe 20 to hold the patch 40 on the pipe 20 while the adhesive sets. In some embodiments, each of the attachment straps 56 is placed within a corresponding attachment notch 52 defined through the outer surface 42 of the patch 40.

In an optional seventh stage 135, once the adhesive has set and the patch 40 is coupled to the pipe 20, the attachment straps 56 are removed from around the pipe 20 and the patch 40. The attachment straps 56 may be removed by cutting through the straps 56, untying the straps 56, or any other suitable method of removing the attachment straps 56 from the patch 40.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A patch for repairing a pipe including a detect comprising:
    a patch body including an outer surface and an inner surface and a patch thickness defined between said patch body outer surface and said patch body inner surface;
    a plug extending from said patch body inner surface, wherein said plug includes a plug outer surface, and wherein said plug outer surface is curved;
    a first attachment notch defined in said patch body wherein said first attachment notch is positioned at a first edge of said patch body, wherein a depth of said first attachment notch is greatest at the first edge of said patch body, and wherein the depth of said first attachment notch decreases moving away from the first edge of said patch body;
    wherein said patch body inner surface is curved and wherein said patch body outer surface is curved, and wherein a radius of curvature of said patch body inner surface is less than the radius of curvature of said patch body outer surface; and
    wherein said curved plug outer surface is parallel to said curved patch body inner surface.

2. The patch of claim 1, further comprising:
    a second attachment notch, wherein said second attachment notch is positioned at a second edge of said patch body, and wherein said second edge is opposite said first edge.

3. The patch of claim 1, wherein said plug has a circular cross section.

4. The patch of claim 1, wherein said patch body wraps around less than 50% of a circumference of the pipe when said plug is fit within the defect of the pipe.

5. A patch for repairing a pipe comprising:
    a patch body including an outer surface and an inner surface, and a patch thickness defined between said patch body outer surface and said patch body inner surface;
    a plug extending from said patch body inner surface;
    a first attachment notch defined in said patch body, wherein said first attachment notch is positioned at a first edge of said patch body, and wherein said first attachment notch is defined through at least a portion of said patch body outer surface;
    wherein a depth of said first attachment notch is greatest at the first edge of said patch body, and wherein the depth of said first attachment notch decreases moving away from the first edge of said patch body; and
    wherein said first attachment notch is configure to receive an attachment strap to secure said patch body to a pipe.

6. The patch of claim 5, further comprising:
    a second attachment notch, wherein said second attachment notch is positioned at a second edge of said patch body, and wherein said second edge is opposite said first edge.

7. The patch of claim 2, wherein a depth of said second attachment notch is greatest at the second edge of said patch body, and wherein the depth of said second attachment notch decreases moving away from the second edge of said patch body.

8. The patch of claim 7, further comprising:
    a third attachment notch, wherein said third attachment notch is positioned at the first edge of said patch body; and
    a fourth attachment notch, wherein said fourth attachment notch is positioned at the second edge of said patch body.

9. The patch of claim 8, wherein said first attachment notch is aligned directly across from said second attachment notch; and wherein said third attachment notch is aligned directly across from said fourth attachment notch.

10. The patch of claim 5, wherein a radius of curvature of said patch body inner surface is less than the radius of curvature of said patch body outer surface.

11. A method of patching a pipe comprising:
    identifying a detect in a pipe;
    inserting a plug extending from a curved inner surface of a patch body of a patch into the defect in the pipe, wherein the plug includes a curved plug outer surface, and wherein said curved plug outer surface is parallel to said curved inner surface of said patch body, and wherein the patch includes a first attachment notch defined at a first edge of said patch body, wherein a depth of said first attachment notch is greatest at the first edge of said patch body, and wherein the depth of said first attachment notch decreases moving away from the first edge of said patch body; and
    securing said patch to said pipe, wherein securing said patch to said pipe includes positioning an attachment strap in said first attachment notch and wrapping the attachment strap around said patch and said pipe when said plug of said patch is inserted into the defect in said pipe.

12. The method of claim 11, further comprising:
    modifying a shape of the defect in said pipe so that the shape of said defect corresponds to the shape of said plug.

13. The method of claim 11, further comprising:
    applying an adhesive onto a pipe wall of said pipe; and
    wherein said adhesive on said pipe wall comes into contact with said curved inner surface of said patch body when said plug is inserted into said defect to attach the patch to the pipe.

14. The method of claim 13, further comprising:
    abrading said pipe wall near said defect prior to applying said adhesive to the pipe wall.

15. The method of claim 11, further comprising:
    applying an adhesive onto said inner surface of said patch body; and
    wherein said adhesive on said inner surface of said patch body comes into contact with a pipe wall of said pipe when said plug is inserted into said defect to attach the patch to the pipe.

16. The method of claim 15, further comprising:
    abrading said inner surface of said patch body prior to applying said adhesive to said inner surface.

17. The method of claim 11, wherein a pipe wall of said pipe includes an outer diameter and an inner diameter, and wherein said curved plug outer surface does not extend past the inner diameter of said pipe wall when said plug is inserted into said defect of said pipe.

\* \* \* \* \*

UNITED STATES PATENT AND TRADEMARK OFFICE
CERTIFICATE OF CORRECTION

| | |
|---|---|
| PATENT NO. | : 11,953,140 B2 |
| APPLICATION NO. | : 17/819084 |
| DATED | : April 9, 2024 |
| INVENTOR(S) | : Wally Jarrett et al. |

It is certified that error appears in the above-identified patent and that said Letters Patent is hereby corrected as shown below:

In the Claims

In Column 7, Line 16, "detect" should be replaced with --defect--

In Column 7, Line 25, "body" should be replaced with --body,--

In Column 7, Line 66, "configure" should be replaced with --configured--

Signed and Sealed this
Fourteenth Day of May, 2024

Katherine Kelly Vidal
*Director of the United States Patent and Trademark Office*